United States Patent [19]
Bellantoni et al.

[11] Patent Number: 5,698,281
[45] Date of Patent: Dec. 16, 1997

[54] COMPOSITE ULTRAFILTRATION MEMBRANE

[75] Inventors: Ellen C. Bellantoni, Framingham; Robert S. Loya, Newburyport, both of Mass.

[73] Assignee: Millipore Corporation, Bedford, Mass.

[21] Appl. No.: 670,250

[22] Filed: Jun. 20, 1996

Related U.S. Application Data

[63] Continuation of Ser. No. 415,033, Mar. 30, 1995, abandoned, which is a continuation of Ser. No. 215,556, Mar. 21, 1994, abandoned, which is a continuation of Ser. No. 971,425, Nov. 4, 1992, abandoned.

[51] Int. Cl.$^6$ .................... B29D 22/00; B32B 3/26
[52] U.S. Cl. .................... 428/35.7; 428/36.1; 428/36.2; 428/36.5; 428/315.5; 428/315.7; 428/316.6
[58] Field of Search .................... 428/36.5, 35.7, 428/36.1, 36.2, 315.5, 315.7, 316.6

[56] References Cited

U.S. PATENT DOCUMENTS

| | | | |
|---|---|---|---|
| 3,651,030 | 3/1972 | Desaulnier et al. | 428/315.7 |
| 4,824,568 | 4/1989 | Allegrezza | 210/490 |
| 4,833,014 | 5/1989 | Linder et al. | 428/315.9 |

*Primary Examiner*—Thurman K. Page
*Assistant Examiner*—Kathryne E. Shelborne
*Attorney, Agent, or Firm*—J. Dana Hubbard; Paul J. Cook

[57] ABSTRACT

A composite ultrafiltration membrane is provided having a microporous polyolefin or sulfone polymer base resistant substrate and an ultrafiltration layer formed from a sulfone polymer.

22 Claims, 3 Drawing Sheets

COMPOSITE ULTRAFILTRATION MEMBRANE

This is a continuation of application(s) Ser. No. 08/415,033 filed on Mar. 30, 1994 now abandoned which is a continuation of Ser. No. 08/215,556 filed on Mar. 21, 1994 now abandoned which is a continuation of Ser. No. 07/971,425 filed on Nov. 4, 1992, and now abandoned.

BACKGROUND OF THE INVENTION

This invention relates to composite ultrafiltration membranes and to a process for producing the membranes. More particularly, this invention relates to composite ultrafiltration membranes made from a polyolefin or sulfone polymer microporous base-resistant substrate and a thin sulfone polymer ultrafiltration layer.

Microporous and open ultrafiltration membranes include thin sheets and hollow fibers generally formed from polymeric materials and having a substantially continuous matrix structure containing open pores or conduits of small size. The mean pore size range for pores of "microporous and open ultrafiltration membranes" is not precisely defined in the aft, but it is generally understood to extend from about 0.02 microns to about 10 microns. Microporus and open filtration membranes having open pores thereby imparting permeability are useful in fine filtration. Composite ultrafiltration (UF) membranes are UF membranes formed on a pro-existing microporous membrane substrate. The composite membranes have better integrity (higher bubble points) than UF membranes cast from the same polymer solutions onto traditional non-woven backing materials such as a non-woven polyester substrate. For example, U.S. Pat. No. 4,824,568 discloses high bubble point membranes that are composites of polyvinylidene fluoride (PVDF) solutions coated onto a 0.22 micron PVDF microporous substrate as well as one of polyethersulfone coated onto a 0.22 micron PVDF microporous substrate. The PVDF solutions are based on solvents that also soften a potion of the PVDF substrate. It is presently believed that this solvent bonding is necessary in order to prevent delamination of the composite structure. The visual bubble point of a PVDF/PVDF composite is about 47 psi. This is substantially higher than the visual bubble point of membranes from the same polymer solutions coated onto a woven polyester substrate which is about 7 psi. Bubble point testing is a traditional technique for evaluating the integrity of membrane filters which have discrete, uniform passages penetrating from one side to the other which can be thought of as fine uniform capillaries. The bubble point test is based on the fact that liquid is held in these capillary tubes by surface tension and that the minimum pressure required to force liquid out of the tubes is a measure of tube diameter. This lack of membrane integrity has limited the use of ultrafiltration membranes in certain applications, particularly sterilization procedures. All of the microporous substrates disclosed by U.S. Pat. No. 4,824,568 are formed of PVDF. The use of PVDF is disadvantageous since PVDF is attacked by common cleaning and sanitizing agents such as 0.5N NaOH. These PVDF based composites, therefore, are not appropriate for use in process streams that foul membranes which then must be cleaned and sanitized by NaOH.

At the present time, the majority of industrial ultrafiltration membranes are asymmetric skinned membranes. Such membranes have structural discontinuity between the skin layer, which may be less than 0.1 micrometers thick, and the sub layer "matrix". They also contain relatively large, often elongated voids, sometimes described as "finger structures", throughout the membrane matrix. Specific examples of commercially available asymmetric skinned ultrafiltration membranes are polysulfone membranes having an overall thickness of about 70–80 micrometers and a very thin skin layer, e.g., about 0.1 micrometers, with varying pore size distributions in the skin layers depending upon the molecular weight cutoff desired. Ultrafiltration membranes typically are produced by casting a homogeneous polymer solution as a thin layer onto an appropriate support and thereafter transforming the polymer solution into a two-phase system thereby to effect pore formation. Typical supports employed are woven or non-woven fabrics. A typical visual bubble point observed with these membranes is about 10 psi. When utilizing a fibrous woven or non-woven substrate, it is difficult to achieve defect-free surfaces when using a thin layer of a polymer solution.

Accordingly, it would be desirable to provide ultrafiltration membranes having a high bubble point so that structural integrity is maintained even when filtering at relatively high pressures. In addition, it would be desirable to provide such ultrafiltration membranes which can be cleaned to be rendered free of contaminants without adversely affecting the mechanical strength of the membrane.

SUMMARY OF THE INVENTION

The present invention provides composite ultrafiltration membranes comprising a porous nonfibrous polyolefin or sulfone polymer microporous base resistant membrane substrate and a skinned ultrafiltration layer bonded to the substrate and formed of a sulfone polymer such as of polyethersulfone, polysulfone, or polyarylsulfone. A solution of the sulfone polymer forming the ultrafiltration layer is applied to the microporous polyolefin or sulfone polymer substrate at a uniform controlled thickness to produce a multilayer composite. The sulfone polymer then is precipitated thereby to form a porous ultrafiltration layer. The resultant porous composite then is washed to remove residual solvent and non-solvent. The molecular weight cutoff of the composite membrane can be controlled by controlling the composition of the sulfone polymer solution as well as by controlling the conditions under which the sulfone polymer solution is applied to the polyolefin or sulfone polymer substrate. By controlling the sulfone polymer solution composition and the application conditions, the present invention provides for the production of a family of composite membranes wherein the molecular weight cutoff can be closely controlled. Unlike, presently available composite ultrafiltration membranes, the composite membrane of this invention can be sterilized in high pH solutions, for example in 0.5M NaOH, to destroy protein retained during use without chemically or mechanically degrading the membrane composite. Thus, the membranes of this invention can be reused. The composite membranes of this invention also are defect free as determined by the bovine serum albumin (BSA) test.

DESCRIPTION OF SPECIFIC EMBODIMENTS

Figure 1:
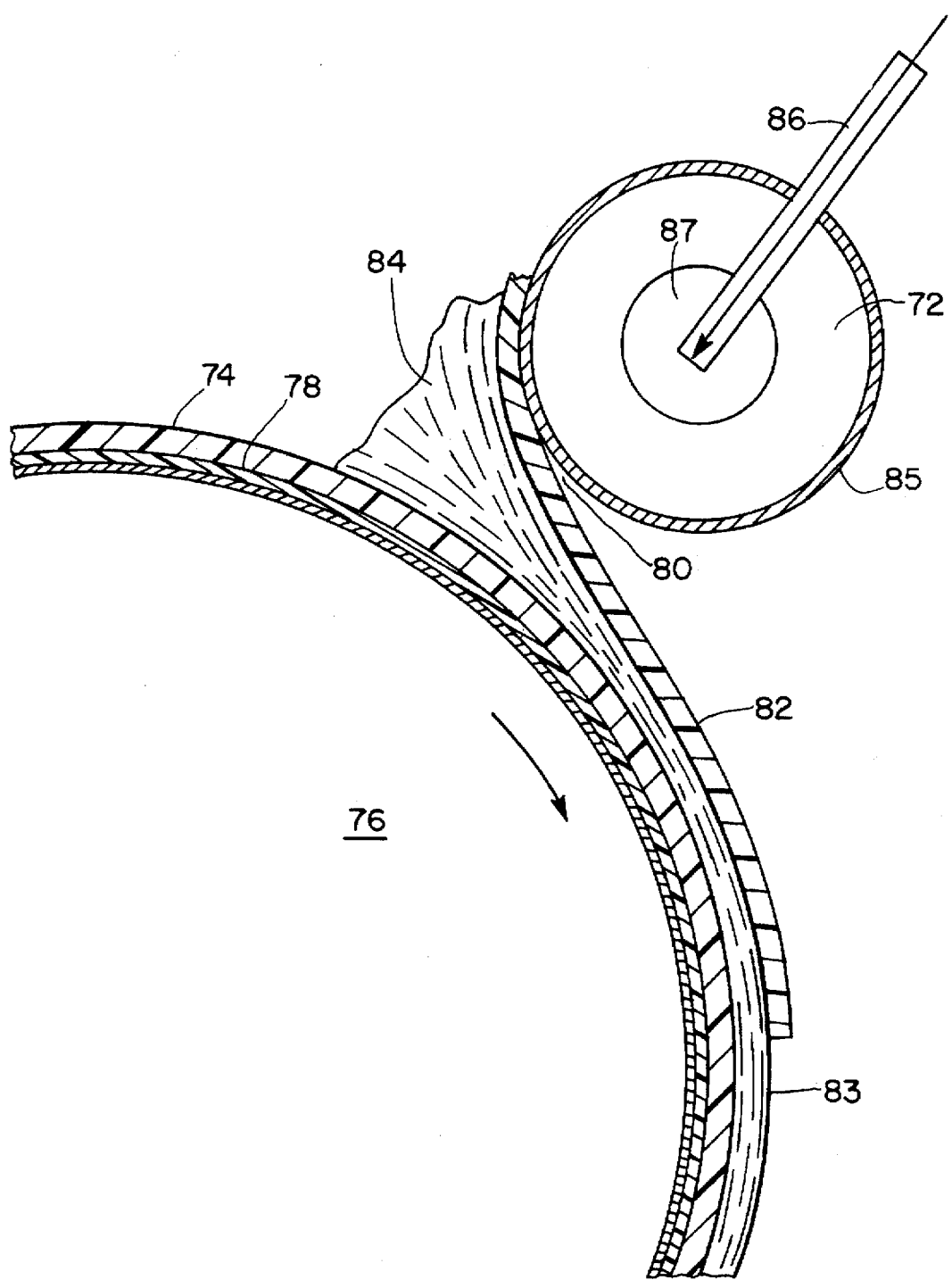
FIG. 1 is a schematic view of a process useful for forming the ultrafiltration membranes of this invention.

The composite membrane of this invention comprises a nonfibrous microporous polyolefin or sulfone polymer substrate coated with an ultrafiltration layer formed of a sulfone polymer. A major advantage of the composite membranes of this invention is that they are resistant to degradation by contact with strong alkali solutions, such as 0.5 m NaOH. Thus, they can be cleaned and then reused. The polyolefin or sulfone polymer membrane substrate produced by phase separation has a pore size range of between about 0.05 and 10 microns and it has a bubble point between about 5 and 60 psi as determined by the visual bubble point method when isopropyl alcohol (IPA) is used as the wetting fluid. The polyolefin microporous membrane substrate can be formed, for example, by the process disclosed in U.S. Pat. Nos. 4,778,601 and 4,828,272 which are incorporated herein by reference. The composite membranes of this invention have a visual bubble point with IPA as the wetting fluid that is greater than the (IPA wet) visual bubble point of prior art membranes of at least 10 psi. The composite membranes of this invention generally have a visual bubble point greater than 20 psi.

The non-woven polyolefin microporous membrane utilized as the substrate for the composite membranes of the invention can be formed by polypropylene or polyethylene including ultrahigh molecular weight polyethylene (UHMW-PE). The nonwoven sulfone polymer substrate can be formed of polysulfone, polyether sulfone, or polyarylsulfone. The polyolefin or sulfone polymer substrate is not degraded by contact with 0.5 m NaOH or other high pH cleaning solutions.

The ultrafiltration layer is formed of a sulfone polymer such as polyethersulfone, polysulfone or polyarylsulfone. The ultrafiltration layer can include up to about 10 weight % of a modifier such as polyvinyl pyrrolidone, polyethylene glycol, or polyvinyl alcohol.

In an optional first step in the process for making the composite membranes of this invention, the pore surfaces of the microporous membrane structure are treated with a liquid protecting agent to minimize or prevent the polymer solvent employed in subsequent coating steps-from penetrating into the membrane. It has been found that treatment with glycerin is suitable. For example the microporous membrane can be immersed in a solution of glycerin. Alternatively, the membrane can be directed as a web over a rotating coating roll having its lower portion immersed in a solution of glycerin.

Liquid protecting agents other than glycerin can be employed. For example, glycols such as ethylene glycol, propylene glycol, triethylene glycol, etc. are also suitable. Usually, it is preferable to select an agent which is miscible with water because this facilitates removal of the agent in a water bath often used in membrane fabrication to extract from the membrane solvents and other materials employed in forming the membrane.

The liquid agents can be dissolved in solutions, such as alcohol solutions. This facilitates application of the agent and the alcohol can be removed by subsequent drying.

In general, an amount of protecting agent is employed which is sufficient to provide the preformed microporous membrane substrate with significant protection against attack from the polymer solvents employed in forming the ultrafiltration membrane and to provide significant protection against membrane penetration by such solvents. The upper amount is determined by practical considerations. For example, it has been observed that too much glycerin can result in lower adhesion of the ultrafiltration membrane subsequently formed. Cost of the agent is another practical consideration. It has been determined that a preferred treating solution comprises from about 15% to about 30%, by weight, of glycerin in isopropanal.

Treating agents that are not liquids could also be employed. For example, water soluble waxes, such as polyethylene oxides, could be melted, and applied to the microporous membrane and removed, if desired, subsequently in the processing with a water bath.

The treated microporous membrane is dried to remove any carrier for the agent, e.g., isopropanol. Drying can be accomplished by conveying the treated membrane over heated rolls, passing it through a heated convection oven, or by other techniques, An ultrafiltration membrane is then formed upon the treated microporous membrane structure. This can be done by coating polyethersulfone solution onto the treated membrane substrate and quickly immersing the coated membrane into a liquid which is miscible with the solvent but is a non-solvent for the polyethersulfone to effect phase separation.

An example of a coating technique for the polymer solution is the process disclosed in U.S. Pat. No. 5,017,292, the teachings of which are hereby incorporated herein by reference. Other coating techniques could be employed such as the use of a knife over roll process such as is described in "Coating and Laminating Machines" by H. L. Weiss published by Converting Technology Co., Milwaukee, Wis. (1977), the teachings of which are incorporated herein by reference. Other coating processes can be employed.

Polymer solutions containing between about 12–25% by weight of the sulfone polymer in a solvent can be utilized in the present invention. Such solutions have been coated to a dry thickness of from about 2 microns to 50 microns, preferably from about 5 to about 20 microns. Other concentrations and thicknesses are possible. Suitable solvents include polar aprotic solvents such as N-methyl pyrrolidone, dimethyl acetamide, 2-pyrrolidone, or the like. These solvents are not solvents for polyolefins.

After the sulfone polymer solution has been cast onto the microporous membrane, the ultrafiltration membrane structure is formed by immersing the coated microporous structure into a liquid which is miscible with the polymer solvent but is a non-solvent for the dissolved sulfone polymer. Water is the preferred liquid, although other liquids can be employed. For example, water-alcohol, water-polymer solvent, water-glycerine mixtures can be employed.

Membrane formation occurs by precipitation of the polymer from the polymer solution. The precipitated polymer forms a porous membrane having a "skinned" or asymmetric structure typical of ultrafiltration membranes. The properties of the membrane can be varied by controlling such parameters as the percent polymer in solution, solvent type, additives, coating thickness, immersion bath composition, immersion bath temperature, etc.

Referring to FIG. 1, coating thickness is controlled by forming a nip between a rotating drum 10 and a non-rotating rubber coated cylinder 12. The microporous substrate 14 is positioned on a support web 18 which contacts the backed drum or roll 10 which can be rotating. Interposed between the rubber coated cylinder 12 and the polymer solution 20 is a plastic film 22 secured so as to partially wrap drum 10. This film 22 can be polyethylene terephthalate or any other film that is not adversely affected by the polymer casting solvent and is strong enough to withstand the shear forces imposed on it. The plastic film 22 can extend several inches past the nip point 26 in the direction of web transport and functions as a smoothing film. That is, the film 22 functions to smooth the exposed surface of the cast polymer solution 28, which exposed surface forms the skin in the final composite membrane of this invention. It has been found that the use of the cylinder 12 and film 22 permits accurate control of the thickness of the cast film 28 which results in the elimination of undesirable voids in the intermediate zone of the composite membrane.

In operation, casting solution 20 is fed to a reservoir on the web entry side of the nip point 26 of the rubber covered cylinder 12 and the drum 10. The moving microporous substrate 14 drags solution under the nip 26 analogous to journal bearing lubrication. A simplified analysis shows that the coating thickness is proportional to the square root of web speed, casting solution viscosity and length under the nip 26, i.e., the "footprint" of the rubber covered roll; and inversely proportional to the square root of the pressure under the nip. The footprint is controlled by rubber hardness and the pressure forcing the cylinder 12 against the drum 10.

In practice, solution viscosity and casting speed are set by membrane property requirements. The hardness of rubber coating 30 is chosen empirically to give the desired range of coating thickness. Pressure on the cylinder 12 is then used to set and control the exact thickness observed. Pressure is set by pneumatic cylinders 32 acting on the metal core 36 of cylinder 12. By controlling the pressure to the pneumatic cylinders 32, the force on the core 36 is controlled. Coating thickness can then be varied by adjusting the inlet pressure to the pneumatic cylinders 32.

After the filtration membrane structure has formed, the composite web is washed by conveying the coated and precipitated web through a water bath. Contact time of approximately two minutes in 25° C. water, for example, is sufficient. The membrane is then rewashed until clean. The rewashed composite membrane is conveyed through a bath containing glycerine and water (typically 20/80). The water is dried off and the glycerine is left behind in the membrane. Drying can then be performed by leaving the rewashed web to dry as single sheets at room temperature. Alternatively, the web can be continuously dried by conveying the web over a perforated roll. The interior of the roll is maintained at sub-atmospheric pressure and a heated air stream (e.g., 150°–175° F.) is impinged on the surface of the web. A typical speed for the web over such a roll is about 6–12 feet per minute.

The membranes of this invention are high integrity and defect free, which is shown by their high retention of a suitable test molecule. For example, 30K nominal molecular weight limit (NMWL) composite membranes retain at least 99.9% of the albumin in a 6% bovine serum albumin feed solution during tangential flow ultrafiltration. Under the same test conditions, conventional 30K NMWL polyether sulfone membranes typically retain only 98–99% of the feed. (Table 1 below). Two representative subclasses of the composite membranes of this invention are characterized as follows: Membranes in a first subclass having a 30K nominal molecular weight limit (NMWL) have a flux of 30–50 gfd/psi and a 90% dextran rejection of 50–90 kilodaltons (kDa). Membranes in a second subclass having a 20 NMWL have a flux of 15–30 gfd/psi and a 90% dextran rejection of 25–50 kDa.

The following examples illustrate the present invention and are not intended to limit the same.

EXAMPLE I

This example illustrates a process making a 30 kD nominal molecular weight cutoff composite ultrafiltration membrane.

Ultrahigh molecular weight polyethylene microporous membrane produced by the process of U.S. Pat. Nos. 4,778,601 and 4,828,772 having an average pore size of 0.3–0.4 micrometers and (IPA) bubble points of 12 to 16 psi were employed as the preformed microporous membrane.

A polymer solution containing 15 wt % polyethersulfone Victrex 5200 grade in 12 wt % butanol, 68% N-methyl pyrrolidone (NMP) and 5% lithium chloride was cast onto the microporous polyethylene membrane at a speed of 15 feet per minute utilizing the applicator of U.S. Pat. No. 5,017,292 with 45 psi applied pressure. The butanol-NMP-lithium chloride solvent is not a solvent for the polyethylene substrate. Thus, there is no adhesion between the polyethylene and the polyethersulfone due to solvent bonding. The coated membrane was then immersed in a water bath maintained at a temperature of 10° C. The composite membrane thus produced was rewashed and immersed in a water bath containing 20 wt % of glycerin maintained at 25° C. for 1 minute and was subsequently dried by conveying the rewashed web over a perforated drying roll having sub atmospheric pressure and a heated air stream of about 150° impinging on the surface of the web which was moving at 10 feet per minute.

Examples 2 and 3 are membranes made by the method of Example 1 except that the polymer solution was cast at 20 feet per minute.

Example 4 is a membrane made by the method of Example 1 except that the pressure applied to the coating roll was 66 psi.

Example 5 is a membrane made by the method of Example 1, except that the line speed was 13.7 feet per minute, the pressure applied to the coating roller was 25 psi, and 1 gram of K-30 polyvinylpyrollidone was added to 99 grams of the polymer solution.

TABLE 1

Water Flux, 90% Dextran Rejection, Visual IPA Bubble Points and BSA Passage for Some Composite Membranes and a 30 kDa. Conventional Membrane

|  | Line speed, psi | Roller pressure, psi | Flux, gfd/psi | 90% Dextran Rejection, kD | Visual IPA B.P., psi | BSA Passage, % |
|---|---|---|---|---|---|---|
| Example 1 | 15 | 45 | 33.2 | 58.2 | 22–24 | 0.04 |
| Example 2 | 20 | 45 | 45.2 | 58.0 | 27–32 | 0.10 |
| Example 3 | 20 | 45 | 46.7 | 62.5 | 27–32 | 0.10 |
| Example 4 | 20 | 66 | 32.9 | 46.5 | 34–38 | 0.10 |
| Example 5 | 13.7 | 25 | 33.8 | 80.5 | N/A | N/A |
| Conventional 30 kD NMWL Control |  |  | 15.5 | 91.0 | about 7 | 2.30 |

Example 6 is a membrane made by the-method of Example 2 except that the polymer solution contained 19 wt % polyether sulfone (Victrex 4100 grade), 8 wt % n-butanol, 4 wt % lithium chloride, and 69 wt % N-methyl pyrollidone.

Example 7 is a membrane made by the-method of Example 2 except that the polymer solution contained 21 wt % polyether sulfone (Victrex 4100 grade), 8 wt % n-butanol, 4 wt % lithium chloride, and 67 wt % N-methyl pyrollidone.

TABLE 2

Water Flux, 90% Dextran Rejection, Visual IPA Bubble Points from Some Composite Membranes and a 10 kDa Conventional Membrane (PTGC)

|  | % of PES Polymer | % of n-Butanol | Roller Pressure, psi | Flux, gfd/psi | 90% Dextran Rejection, kD | Visual IPA B.P., psi |
| --- | --- | --- | --- | --- | --- | --- |
| Example 6 | 19 | 8 | 45 | 25.5 | 5.5 | 34–36 |
| Example 7 | 21 | 8 | 45 | 13.6 | 23.5 | 44–45 |
| Example 8 | 20 | 15 | 125 | 27.0 | 34.0 | N/A |

Example 8 is a membrane made by the-method of Example 2 except that the pressure applied to the coating roll was 125 psi, and the polymer solution contained 20 wt % polyether sulfone (Victrex 4100 grade), 15 wt % n-butanol, 4 wt % lithium chloride, and 61 wt % N-methyl pyrollidone.

The membrane of Example 8 exhibited nondetectable passage of endotoxin.

EXAMPLE 9

A microporous polyether sulfone membrane having an average IPA bubble point of about 15 psi was employed as the microporous substrate. The microporous membrane substrate was soaked in a 20% aqueous glycerin solution and allowed to dry until essentially all the water was removed. Then a composite membrane was made by the method of Example 5, except that the microporous substrate was polyether sulfone. The polymer solution containing 21 wt % polyether sulfone (Ultrason E6010 grade), 15 wt % n-butanol, 4 wt % lithium chloride, and 60 wt % N-methyl pyrollidone, and the line speed was 10 feet per minute.

The composite ultrafiltration membrane formed had a water flux of 6 gfd/psi, and dextran rejection similar to the PTTK®ultrafiltration membrane. Its viual IPA bubble point was about 50 psi.

Figure 2:
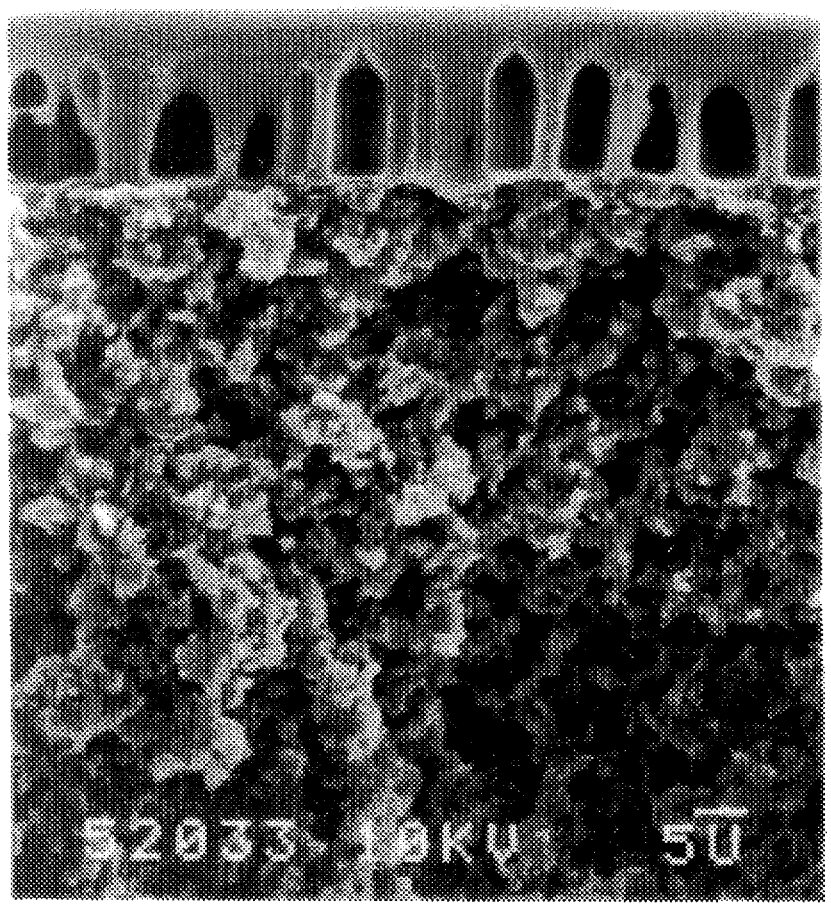
FIG. 2 is a photomicrograph at 2400×magnification of the cross-section of a membrane of this invention.
Figure 3:
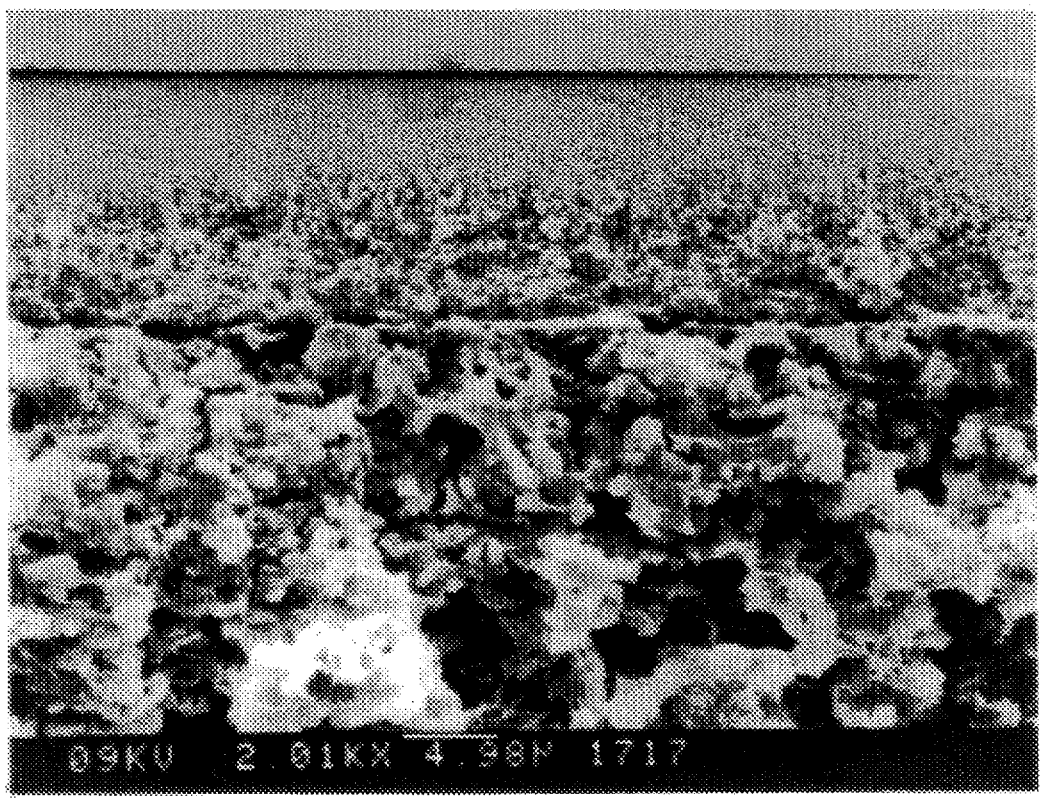
FIG. 3 is a photomicrograph at 4200×magnification of the cross-section of a membrane of this invention.

The cross-section of the membrane of Example 1 is shown in FIG. 2. The cross-section of the membrane of Example 8 is shown in FIG. 3.

The composite ultrafiltration membranes formed were characterized by water flux, visual (IPA wet) bubble points and by dextran rejection properties. Integrity of the 30 kDa. membranes was measured with the BSA test. The test methods were performed as follows:

WATER FLUX

This test is carrier out using an Amicon (Amicon Corp., Lexington, Mass.) stirred cell, model 52. A wetted membrane is placed in the cell. The cell is filled with deionized water, connected to a pressurized air supply, and pressurized to 25 psig. Effluent is collected over a standard test time and the flux calculated using the known membrane area. Alternatively, automatic flux testing instrumentation may be used to test the membranes.

VISUAL BUBBLE POINTS

The visual bubble point test is used to determine the maximum pore size of a permeable membrane. The test is based on the fact that liquid is held in the membrane pores by surface tension effects. The minimum pressure required to force liquid out of the pores is a measure of pore diameter as described by the Washburn equation:

$P = k4 \delta \cos \varnothing / d$

P=bubble point pressure
$\delta$=surface tension
$\varnothing$=liquid/solid contact angle
d=pore diameter
k=shape correction factor ASTM Method 316-80 is employed. In general, this bubble point test is performed by prewetting the filter with the liquid to be used, increasing the pressure of air up-stream of the filter and watching for bubbles downstream of the filter. The passage at which a continuous stream of bubbles appears is the visual bubble point.

Rejection of model solutes is the most common method for describing the expected performance of ultrafiltration membranes. Thus, nominal molecular weight limits (NMWL) can be determined with a variety of solutes; frequently proteins are used. The NMWL of a UF membrane is typically the molecular mass of the smallest protein that the membrane rejects at a chosen level, usually 90 to 95%. Other solutes that can be used to characterize UF membranes include dextrans, which are available in a large range of molecular weights. The whole rejection spectrum, from molecules of about 1000 daltons molecular weights to molecules of about 2,000,00 daltons can be measured in a single test.

The test is based on methods published, inter alia, by L. Zeman and M. Wales, in "Separation Science and Technology" 16 (30), p. 275–290 (1981). The membranes to be characterized are challenged with solutions containing polydisperse dextrans with molecular weights 1000 to 2,000,00 daltons in a suitable device; the permeation rate during the test is controlled at low flux to minimize concentration polarization. Feed and permeate streams are sampled and analyzed by size exclusion chromatography (SEC); the chromatographic data is used to calculate rejection as a function of dextran molecular mass.

Rejection (R) with dextran molecular mass is R=1−Cp/Cf, where Cp and Cf are the dextran concentrations of given molecular mass in the feed and the permeate, respectively. The molecular weight at which the membrane retains 90% of the dextran feed is the 90% dextran rejection value. Although it is common to call the 90% dextran rejection value a cutoff, care must be taken to distinguish it from cutoffs measured with other solutes such as the solutes used to determine the NMWL.

BSA TEST

The test for BSA passage measures the percent of bovine serum albumin (BSA) that is not retained by membranes during the ultrafiltration of a BSA containing challenge solution. The challenge solution is 6.0% BSA, (Cohn Fraction V, Sigma A-7906 or equivalent) in phosphate buffered saline (PBS, Difco Bacto Buffer or equivalent). The membranes to be challenged are rifled into Minitan-S ultrafiltration devices (available from Millipore Corporation, Bedford, Mass.) and the BSA containing feed solution is allowed to circulate in a recycle mode across the test membranes for about 0.5–1 hour before permeates are taken. The feed is sampled when the permeates are taken; feed samples are diluted for assay so that their BSA concentration is approximately that of the permeate.

The amount of BSA in each permeate or diluted feed sample is assayed by allowing it to react with bicinchoninic acid (BCA) (U.S. Pat. No. 4,839,295) to form a colored BSA/BCA complex and measuring the absorbance of the complex relative to the absorbance of standard BSA/BCA complex at 562 nm. The standard BSA/BCA solutions are made from known concentrations of BSA and BCA.

A set of BSA standards of appropriate concentrations is allowed to react with BCA reagent at the same temperature and for the same time as the permeate samples and the diluted feed samples. The absorbance each standard BSA/BCA complex is measured at 562 nm with a spectrophotometer and standard curve is constructed from the absorbance of the standard BSA/BCA complexes with their concentrations. Then, the amount of BSA in each permeate or diluted feed is determined from the standard curve. The BSA concentration of each feed is calculated from the amount of BSA measured in the diluted feed and the degree of dilution. The BSA passage is calculated from the concentration of BSA in the permeate and in the undiluted feed.

A test kit for the BCA assay is commercially available (Pierce, Rockford, Ill. 61105 USA).

We claim:

1. A composite high integrity ultrafiltration membrane comprising a preformed nonfibrous microporous membrane formed of a polyolefin polymer and an asymmetric polymeric sulfone ultrafiltration membrane integrally formed on said microporous membrane by phase separation as a separate layer.

2. A composite high integrity ultrafiltration membrane comprising a preformed nonfibrous polyethylene microporous membrane and an asymmetric polyethersulfone ultrafiltration membrane integrally formed on said microporous membrane by phase separation as a separate layer.

3. The composite integral membrane of claim 2 wherein said polyethylene is ultra high molecular weight polyethylene.

4. A composite high integrity ultrafiltration membrane comprising a preformed nonfibrous polyethylene microporous membrane and an asymmetric sulfone polymer integrally formed on agent as a separate layer.

5. A composite high integrity ultrafiltration membrane essentially consisting of a preformed nonfibrous polyethylene microporous membrane and an asymmetric sulfone polymer integrally formed on said microporous membrane by phase separation as a separate layer, said composite membrane having a flux between about 15 and 30 gfd/psi and a 90% dextran rejection between 25 and 50 kDa.

6. The composite membrane of claim 2 having a visual bubble point (IPA wet) of at least 20 psi.

7. The composite membrane of claim 4 having a water flux of at least about 30 gfd/psi and a passage of bovine serum albumin of about 0.1% or less.

8. The composite membrane of claim 5 having a flux of at least about 25 gfd/psi and a nondetectable passage of endotoxin.

9. The composite membrane of claim 2 in which the polyether sulfone ultrafiltration membrane is formed from a sulfone polymer solution which contains up to 10 grams of a polymeric additive for every 100 grams of sulfone polymer solution.

10. The composite membrane of claim 9 in which the polymeric additive is polyvinyl pyrollidone.

11. The composite membrane of claim 10 having a flux of at least about 30 gfd/psi and a 90% dextran rejection of about 80 kDa.

12. The composite membrane of claim 4 having a flux of at least about 30 gfd/psi and a 90% dextran rejection of about 60 kDa.

13. The composite membrane of claim 4 having a flux of at least about 45 gfd/psi and a 90% dextran rejection of about 60-kDa.

14. The composite membrane of claim 4 having a flux of at least about 30 gfd/psi and a 90% dextran rejection of about 45-kDa.

15. The composite membrane of claim 5 having a flux of at least about 27 gfd/psi and a 90% dextran rejection of about 35-kDa.

16. The composite membrane of claim 5 having a flux of at least about 25 gfd/psi and a 90% dextran rejection of about 25-kDa.

17. The composite membrane of claim 5 having a flux of at least about 14 gfd/psi and a 90% dextran rejection of about 25 kDa.

18. A composite high integrity ultrafiltration membrane essentially consisting of a preformed polyether sulfone microporous membrane and an asymmetric polyethersulfone ultrafiltration membrane integrally formed on said microporous membrane as a separate layer.

19. The composite membrane of claim 18 having a flux of at least about 6 gfd/psi and dextran rejection typical of ultrafiltration membranes.

20. The composite membrane of claim 18 wherein said preformed sulfone polymer microporous membrane is formed of polyether sulfone.

21. The composite membrane of claim 18 wherein said sulfone polymer ultrafiltration membrane is formed of polyether sulfone.

22. The composite membrane of claim 18 wherein said preformed sulfone polymer microporous membrane is formed of polyether sulfone and said sulfone polymer ultrafiltration membrane is formed of a polyether sulfone.

\* \* \* \* \*